June 30, 1964 P. SADLER 3,138,958
VACUUM GAUGES
Filed Aug. 18, 1960 2 Sheets-Sheet 1

INVENTOR:
Peter Sadler
BY
Bierman + Bierman
Attorneys

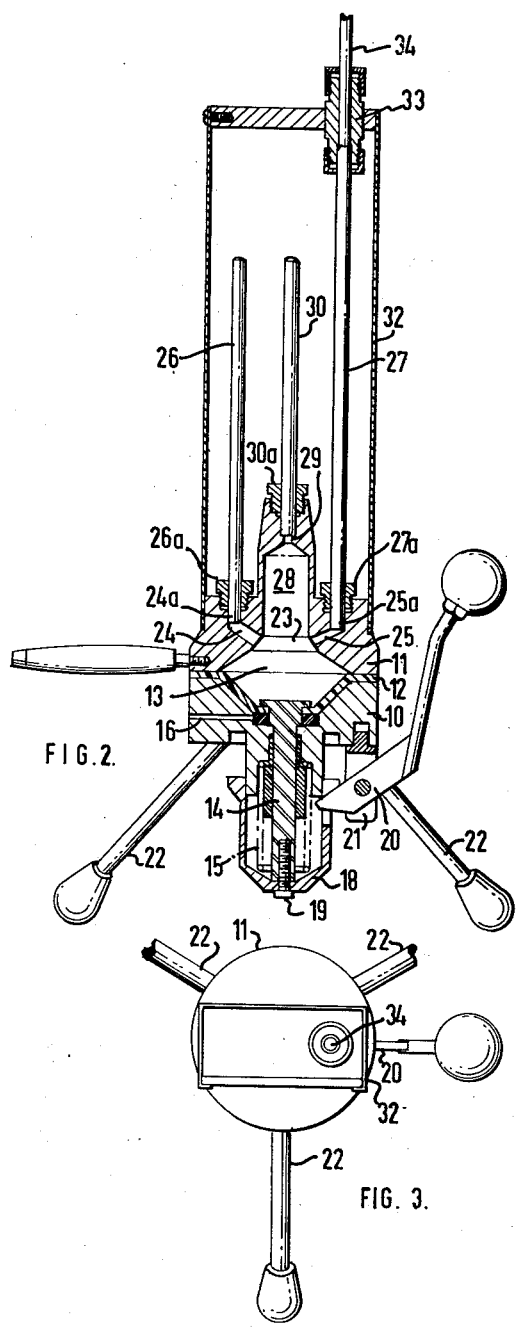

United States Patent Office 3,138,958
Patented June 30, 1964

3,138,958
VACUUM GAUGES
Peter Sadler, Salford, England, assignor to Genevac Limited, a corporation of Great Britain
Filed Aug. 18, 1960, Ser. No. 50,497
Claims priority, application Great Britain Aug. 19, 1959
12 Claims. (Cl. 73—400)

This invention relates to vacuum gauges.

There are several known types of vacuum gauges, but the two types most frequently in use are the McLeod gauge and the Manometer or U-tube, including modifications thereof. Each of these types of gauges has its known characteristics which give inherent advantages and disadvantages. For instance, the McLeod gauge has a capillary tube with logarithmic scale which is a function of volumetric factors of design and an antecedent compression volume, and therefore, the range of the capillary is extensible and readily adaptable for accurate readings over a particular part of a required range such as for higher vacuum readings; whilst the Manometer has a lineal scale which is relatively inextensible and is, therefore, less readily adaptable for accurate higher vacuum readings. The mercury in the McLeod or compression type capillary gauge is contained by a liquid-containing diaphragm attached to an external thimble with means for raising and lowering the latter.

For many purposes, and for the above reasons, it is customary to provide in juxta position, both types of gauge, i.e. the McLeod or compression type capillary and a modified Manometer, each for its own range characteristics. For example, a dual range gauge is known having side-by-side a liquid manometer and a compression type capillary McLeod gauge, but in order to shorten the length of the direct reading manometer column, the mercury chamber has to be placed under an auxiliary vacuum. This construction not only involves the variable of such auxiliary vacuum and the inaccuracies arising therefrom, but also modifies the range of the compression type capillary. In another known modification of the McLeod gauge, there are two compression type capillaries with supplementary compression volumes in series and with the first or lower-most compression volume larger than the second and common to both capillaries. Whilst providing a dual range gauge, each compression type capillary gauge is suitable only for the higher range of vacuum readings, so that a direct reading manometer would still be required for many modern uses of vacuum gauges.

One disadvantage of the McLeod type of gauge is, however, that they have always been made wholly of glass and are relatively vulnerable and can easily be broken by accident or by unskilled manipulation. Another disadvantage is that the glass work has hitherto been manufactured by hand and, consequently each has to be individually calibrated, thereby adding substantially to the cost of manufacture.

One object of the present invention is an improved multi-range compression type capillary McLeod gauge having a wide difference of scale reading so that one capillary covers the high vacuum range and the other covers the lower pressure range such as is normally covered by a direct reading manometer.

Another object of the invention is to safe-guard the gauge against accident or unskilled manipulation and to prevent the mercury from being accidentally ejected into the vacuum system.

A still further object of the invention is a generally improved construction of gauge to give greater manufacturing accuracy permitting standardisation of scale and capillary tubes and facilitating assembly and repair.

According to the invention a compression type capillary gauge characterised by a body part fabricated separately from the capillary tube and including at least one antecedent compression volume, and means for mounting at least one capillary tube on said body part in communication with such volume or volumes whereby each such antecedent compression volume and capillary tube may be readily standardised and the gauge more accurately and cheaply manufactured.

The compression type capillary gauge aforesaid may be further characterised by spring return means for the liquid containing diaphragm.

According to a preferred embodiment of the invention, a multi-range vacuum gauge of the compression type capillary is further characterised by a cut-off for a longer vacuum-range capillary substantially coincident with the cut-off for an auxiliary antecedent volume for the shorter vacuum range capillary for measuring the higher vacuum readings; or further characterised in that the capillary tube for the lower pressure range is connected to the cut-off zone by a passage having a cross section not substantially larger than the cross section of that capillary tube and of minimum length; or further characterised in that the capillary for the lower pressure range is connected to its "cut off" zone in such manner that the capillary can be sealed to cover a range from zero to 150 mm. pressure and complementary to a high pressure range capillary of from zero to 2,000 microns.

A multi-range vacuum gauge according to the invention may be characterised in that the capillary for the lower pressure range is connected to the cut-off zone having a cross section not substantially larger than the cross section of the capillary and of minimum length; or characterised in that the capillary for the lower pressure range is connected to its cut-off zone in such manner that the capillary can be sealed to cover a range from zero to 150 mm. pressure and complementary to a high pressure range capillary of from zero to 2,000 microns.

In the accompanying drawings:

FIG. 2 is a side elevation of the vacuum gauge shown in FIG. 1;

FIG. 3 is a plan.

Figure 1:
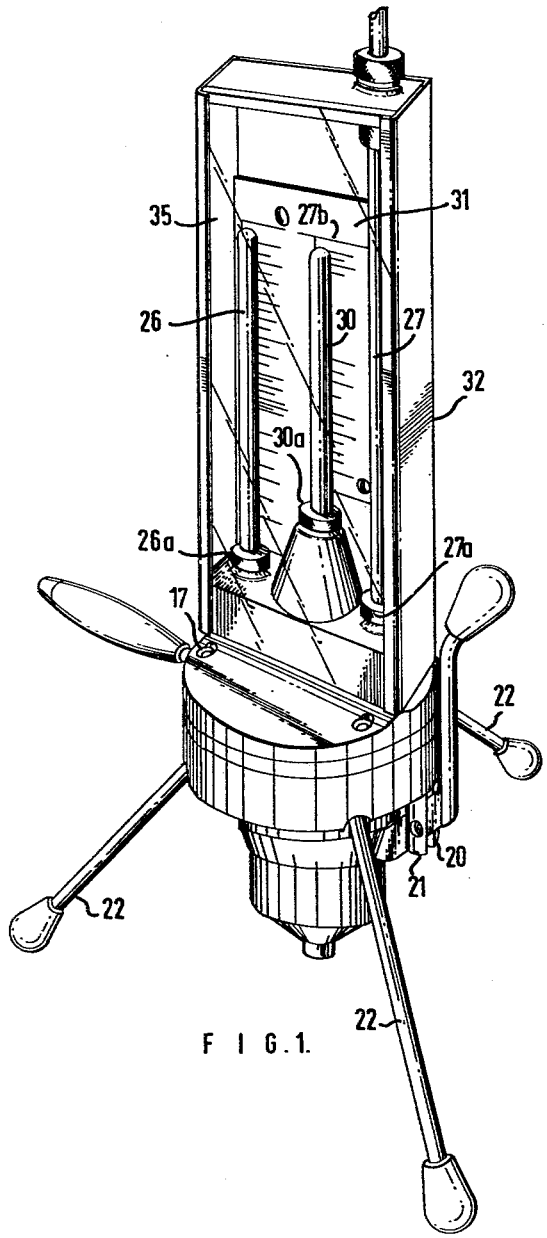
FIG. 1 is a perspective view of one example of a vacuum gauge made in accordance with the present invention.

As shown in the drawings, the gauge comprises a two-part block 10, 11 between which is secured a flexible diaphragm 12. The two parts of the block are recessed in truncated-cone shape to provide a mercury reservoir 13. The diaphragm is normally stressed downwardly into the lower part 10 by a stem 14 secured to the diaphragm, and a spring 15 of such strength as to exceed the maximum possible atmospheric pressure on the diaphragm, air being admitted to the underside thereof by a passage 16. The two parts 10 and 11 are secured together by means of Allen screws 17. The spring 15 is enclosed by a thimble 18 attached by a screw 19 to the lower end of the stem 14, which thimble is adapted to be raised by a lever 20 pivotally mounted in a bracket 21 secured to the part 10. Hitherto such thimble has been constructed for raising and lowering by means of a screw. The thimble has to be raised to bring the liquid in the datum tube 27 to a datum line 27b and should be lowered after taking a reading so as to protect the capillary tubes against shock pressures, but this lowering operation can easily be forgotten or neglected. Legs 22 are provided to enable the gauge to stand upright on a suitable supporting surface.

The upper part 11 of the block is provided, immediately above the conical recess aforesaid, with a short conical portion 23 from which lead off two inclined passages 24, 25 which join with short vertical passages 24a, 25a adapted to receive the lower ends of glass tubes 26, 27 respectively, of which the tube 26 is a capillary tube sealed at its upper end. The passages 24 and 25 are substantially on the same level at their lower ends so that they provide a simultaneous "cut-off" for the passage 24 and the auxiliary volume 28, as explained later. Above the portion 23, the upper part has an auxiliary compression volume 28 leading to a passage 29 the upper end of which is shaped to receive a glass capillary tube 30. Gland nuts 26a, 27a and 30a are provided which, with gland packings, enable the ends of the tube to be effectively sealed and secured in position. Each socket for the tubes is shaped to provide axial location therefor so that the tubes can be pre-calibrated before insertion, or used with a standard scale 31. A metal casing 32 is attached to the upper part to protect the tubes and carries at its upper end a coupling 33 for the upper end of the glass tube 27 and for a connecting pipe 34 for connecting the device to the vacuum system. The casing is fitted with a glass front 35.

In use, when the device is connected to a vacuum system in which it is desired to measure the degree of vacuum obtaining, depression of the lever 20 enables the diaphragm to be raised causing mercury to rise in the tubes. The lever is moved until the mercury in the tube 27 reaches a zero setting on the scale as indicated by the datum line 27b and is held there whilst readings are taken from the mercury positions in the capillary tubes 30 and 26. Because of the short length of the passage 24 and its small bore, being substantially the same as that of the tube 26, a long range of reading is possible in the length of the tube, covering easily from zero to 150 mm. The simultaneous shut off of the auxiliary chamber 28 and passage 24 makes full use of the volume of the chamber 28 and, therefore, a relatively long scale is possible covering the higher vacuum range from zero to 2,000 microns. Because the body part can be made in metal, great accuracy is possible as regards the volume of the passage 24 and chamber 28 and also the closed-ended capillary tubes 26 and 30 can be manufactured to accurate length and bore. Thus, a high accuracy is obtainable. By providing spring loading for the diaphragm, it is impossible to leave the lever 20 raised with the mercury raised in the tubes as the spring is strong enough to return the diaphragm even against full atmospheric pressure. There is, therefore, less risk of bursting the glass capillary tubes 26 and 30 or of getting the mercury drawn out of the gauge through the tube 27.

Whilst the above description specifies mercury as the operating liquid, the invention is not limited thereto but some other suitable liquid, such as a low pressure silicone oil, could be used.

I claim:

1. A compression type capillary gauge comprising a block having a reservoir for liquid, a diaphragm clamped in said reservoir, a thimble below said block and attached to said diaphragm, means for sliding said thimble to move said diaphragm in said reservoir, an auxiliary chamber directly above and communicating with said reservoir, said auxiliary reservoir being unitary with and an upward extension of said block, a first closed ended vacuum measuring capillary tube communicating with said auxiliary chamber, a first passage at the junction of said reservoir and chamber connected to a source of vacuum to be measured, a second passage from said junction, a second closed ended vacuum measuring capillary tube connected to said second passage.

2. A capillary gauge according to claim 1 characterized in that said thimble is biased downwardly.

3. A capillary gauge according to claim 1 characterized in that said thimble is biased downwardly by a spring held between said thimble and block.

4. A capillary gauge according to claim 1 characterized in that there is a lever pivoted on said block and connected to said thimble for raising said thimble.

5. A capillary gauge according to claim 1 characterized in that a short passageway connects said chamber and said first vacuum capillary tube, the cross-sectional area of said passageway being not substantially larger than that of said tube.

6. A capillary gauge according to claim 1 characterized in that one of said capillary tubes is adapted to cover a range of 0 to 150 mm. and the other 0 to 2000 microns.

7. A capillary gauge according to claim 1 characterized in that said source includes an upstanding tube, and a zero setting on said upstanding tube.

8. A compression type capillary vacuum gauge comprising a body part having a mercury holding volume, a volume of mercury partly filling said mercury holding volume, means for connecting said mercury holding volume above the normal level of the mercury to the vacuum to be measured, means for varying said mercury holding volume to provide the compression, a plurality of sockets with sealing glands each connected to the mercury holding volume and adapted to receive and removably hold the lower end of capillary tubes, said body having also an auxiliary volume connected to the mercury holding volume and above said socket connection for at least one of the capillary tubes, said auxiliary volume being the volume above the level of the connection to the vacuum in the mercury holding volume as the mercury rises with the application of compression, said auxiliary volume being unitary with and an upward extension of said body part.

9. A compression type capillary vacuum gauge according to claim 8 in which said means for varying the mercury holding volume comprises a diaphragm, lever means for moving the diaphragm and spring means for normally holding the diaphragm against the force of the vacuum.

10. A compression type capillary vacuum gauge according to claim 8 wherein the connection of the mercury holding volume to one socket is so constructed as to have a cut-off coincident with the cut-off for the vacuum connection.

11. A compression type capillary vacuum gauge according to claim 10 wherein the connection to the one socket is of minimum length and of cross-section not substantially larger than the cross-section of the capillary tube to be fitted to such socket.

12. A compression type capillary vacuum gauge according to claim 8 wherein said body is of metal and at least one of said capillary tubes is straight and of substantially uniform diameter.

References Cited in the file of this patent

UNITED STATES PATENTS

| | | |
|---|---|---|
| 1,508,242 | Partzsch | Sept. 9, 1924 |
| 1,984,994 | Rose | Dec. 18, 1934 |